FIG. I

ULTRAVIOLET ABSORPTION SPECTRUM OF PHENOMYCIN

INFRARED ABSORPTION SPECTRUM OF PHENOMYCIN

United States Patent Office 3,565,988
Patented Feb. 23, 1971

3,565,988
ANTIBIOTIC
Hamao Umezawa, 23 4-chome, Toyotama Kita,
Nerima-ku, Tokyo, Japan
Filed May 8, 1968, Ser. No. 727,647
Int. Cl. A61k 21/00
U.S. Cl. 424—117                                    5 Claims

ABSTRACT OF THE DISCLOSURE

Phenomycin inhibits the growth of Ehrlich ascites tumor and Sarcoma 180. The antibiotic phenomycin is produced by fermentation of a new variety of *Streptomyces fervens* which has been designated *Streptomyces fervens* var. *phenomyceticus*.

BACKGROUND OF THE INVENTION

(1) Field of the invention

This invention relates to a new antibiotic substance and to its production. More particularly, this invention relates to a new antibiotic substance designated phenomycin and to a process for the preparation thereof by fermentation of a new variety of the species *Streptomyces fervens* designated *Streptomyces fervens* var. *phenomyceticus*. This invention also relates to the recovery and purification of the antibiotic.

(2) Description of the prior art

Various antibiotics are known in the art, however, there exists a need for additional antibiotics.

SUMMARY OF THE INVENTION

There is provided by the present invention the antitumor agent phenomycin. The substance is produced by cultivating a phenomycin-producing strain of *Streptomyces fervens* var. *phenomyceticus* in an aqueous carbohydrate solution containing at least one nitrogenous nutrient under submerged aerobic conditions until a substantial quantity of phenomycin is formed in said solution. This invention embraces this antitumor agent and its pharmaceutically acceptable nontoxic salts in dilute solution, as crude concentrates, as crude solids and as purified solids.

DETAILED DESCRIPTION

Figure 1:
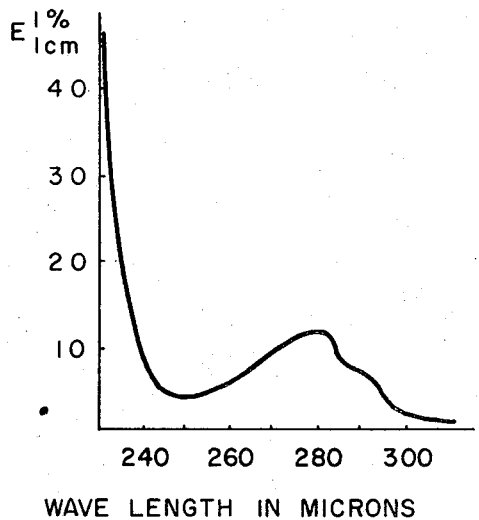
FIG. 1 shows the ultraviolet absorption spectrum of phenomycin in water.

Phenomycin inhibits the growth of Ehrlich ascites tumor and Sarcoma 180 in mice. The antibiotic is also useful for removing tumor cells from laboratory equipment and other contaminated materials. It is also useful for separating tumor cells from bacterial cells.

Phenomycin inhibits the growth of Ehrlich ascites tumor and Sarcoma 180 in mice. The antibiotic is also useful but has practically no inhibition against pathogenic microorganisms. It is soluble in water and slightly soluble in alcohols, esters, acetone, ether, and benezene. It exhibits weak maximum absorption of ultraviolet light at 278 m$\mu$. It gives a positive ninhydrin reaction and its elemental analysis is C, 47.25%; H, 7.30%; N, 15.77%; S, 0.79%. The optical rotation, $[\alpha]_D^{17}$ of a solution of 20 mg. of phenomycin in 5 cc. of water is $-18°$. Its molecular weight determined by ultracentrifugation is less than 10,000. It gives 16 amino acids and ammonia upon hydrolysis. It moves to the cathode under electrophoresis on acetate cellulose with phosphate buffer of pH 7.0. Its infrared absorption spectrum when pelleted with potassium bromide exhibits characteristic absorption bands at 3,440, 2960, 1650, 1530, 1440, 1385, 1345, 1240 and 1125 cm.$^{-1}$.

The organism producing the antibiotic of the present invention was isolated from a soil sample collected at Shikine Island, Tokyo, Japan and given the laboratory designation MA 564–C1. A culture of MA 564–C1 was deposited in the culture collection of the National Institute of Health, Tokyo, Japan and is available therefrom under accession number NIHJ MC–1–42.

The strain MA 564–C1 has the following mycological characteristics: The well branched substrate mycelium developed long aerial mycelium, and formed primary and secondary whorls. No spiral structures were observed in the culture on glucose asparagine agar. Conidial spores in the culture on a starch agar plate after 17 days incubation exhibited a smooth surface under an electron-microscope.

The strain MA 564–C1 showed the following cultural characteristics.

(1) On glycerol-nitrate agar medium incubated at 27° C.; Pale red to grayish red growth with pinkish aerial mycelium. No soluble pigment.

(2) On Krainsky's glucose asparagine agar incubated at 27° C.; Pale red or purplish red to brownish red growth with pinkish aerial mycelium. No soluble pigment.

(3) On calcium malate agar incubated at 27° C.; Colorless to pinkish or creamy colored growth with white or pinkish aerial mycelium. No soluble pigment. Calcium malate around the growth was solubilized.

(4) On peptone solution containing 1.0% NaNO$_3$ incubated at 27° C.; Colorless to yellowish brown growth changed to brownish later. Peptone solution became blackish. No reduction of nitrate.

(5) On potato plug incubated at 27° C.; Growth is colored pale yellowish brown to pale yellowish brown with olive or pinkish tinge. Scant white to pinkish aerial mycelium. Plug changed to blackish.

(6) On starch agar plate incubated at 27° C.; Pale pinkish to purplish red growth with pale brownish aerial mycelium. No soluble pigment. Strong hydrolysis of starch.

(7) On nutrient agar incubated at 37° C.; Colorless to pale yellowish growth changed to yellowish brown. No aerial mycelium. Brown to yellowish brown soluble pigment.

(8) On nutrient agar incubated at 27° C.; Colorless to yellowish brown growth with no aerial mycelium. Brown soluble pigment was deeper than that at 37° C.

(9) On blood agar incubated at 37° C.; Colorless to reddish brown growth with no aerial mycelium. Hemolysis was observed but no soluble pigment.

(10) On Loeffler's coagulated serum medium incubated at 37° C.; Colorless or pinkish growth changed to pale yellowish later. No aerial mycelium. Brown soluble pigment was produced around the growth. No liquefaction of coagulated serum.

(11) Stab culture on gelatin incubated at 20° C.; Pale red to reddish brown growth with no aerial mycelium. Brown to reddish brown soluble pigment. Positive liquefaction of gelatin.

(12) In skimmed milk incubated at 37° C.; Creamy to pale reddish growth changed to yellowish brown. No aerial mycelium. Brown soluble pigment. Strong coagulation and peptonization of milk.

(13) On tyrosine agar incubated at 27° C.; Colorless to pinkish growth with pinkish aerial mycelium. No soluble pigment. Negative tyrosinase reaction.

(14) On cellulose (filter paper in nitrate solution) incubated at 27° C.; No or weak growth.

(15) Utilization of carbohydrates for growth in Pridham-Gottlieb's basal medium incubated at 27° C.; Good growth with mannose, starch, dextrin, maltose, glycerol, glucose and fructose. Poor growth with sucrose and arabinose. Ambiguous result with galactose. Practicalllly no growth with inosito, lactose, mannitol, raffinose, rhamnose, inulin, sorbitol, dulcitol, xylose and salicin.

Summarizing the above characteristics, strain MA 564–Cl belongs to the genus Streptomyces, forms whorl branching, possesses conidial spores having a smooth surface, pinkish aerial mycelium on the growth with pinkish, pale reddish or brownish color. No soluble pigment is produced on synthetic media but brown to blackish soluble pigment is produced on some of the organic media. It exhibits strong proteolytic activity and hydrolytic activity. Whereas the results of repeated tests showed negative tyrosinase reaction on tyrosin agar, it produces brown soluble pigment on organic media such as nutrient agar or gelatin, and it likely belongs to the chromogenic type.

Among the known species of Streptomyces having characteristics similar to strain MA 564–Cl, the strain resembles most *Streptomyces fervens* DeBoer et al. Comparing with the description of *S. fervens* which appeared in Antibiotics Annual 1959/60, p. 220, the strain resembles *S. fervens* except for differences such as the positive tyrosinase reaction of the latter (whereas S. A. Waksman described negative melanin of the latter in "The Actinomycetes," vol. 2, p. 163), no coagulation or peptonization of milk, positive reduction of nitrate, and the utilization of inulin (but not fructose) by the latter. These differences lead to the conclusion that the strain is a new variety of *Streptomyces fervens*, *Streptomyces fervens* var. *phenomyceticus*. Variation and mutation of the above described organism is naturally expected since such is a common property of an actinomycete. *Streptomyces fervens* var. *phenomyceticus* includes the typical strain described above, and all natural and artificial variants and mutants thereof. That is, by definition *Streptomyces fervens* var. *phenomyceticus* of the present invention includes all strains producing phenomycin except those which can be absolutely differentiated therefrom.

*Streptomyces fervens* var. *phenomyceticus* when grown under suitable conditions produces phenomycin. A fermentation broth containing phenomycin is prepared by inoculating spores or mycelia of the phenomycin producing organism into a suitable medium and then cultivating under aerobic condition. For the production of phenomycin, cultivation on a solid medium is also possible, but for production of large quantities cultivation in a liquid medium is preferred. Any fermentation temperature can be employed within the range in which the phenomycin producing organism can grow and produce phenomycin, although 25–35° C. is preferred. Media consisting of known kinds of nutritional sources for actinomycetes are useful for the production of phenomycin. For example, commercial products such as peptone, meat extract, corn steep liquor, cottonseed flour, peanut flour, soybean flour, yeast extract, N–Z amine, casein, sodium nitrate, ammonium nitrate, ammonium sulfate and other nitrogenous materials such as wheat bran, rice bran, etc. are useful as the nitrogen source. Commercially available products, such as lactose, glycerol, sucrose, starch, glucose, maltose, molasses and other carbohydrates or fats in pure or crude state are useful as the carbon source. Sodium chloride, sodium or potassium phosphate, calcium carbonate or magnesium sulfate can be also added. Traces of metal salts can be added, if desired. Any materials which can be utilized by phenomycin producing organisms for the production of phenomycin are useful. Any materials employed in the cultivation of actinomycetes, such as the materials described in U.S. Pat. No. 2,931,798, are useful.

The fermentation and assay methods used herein are as follows, unless otherwise specified.

(1) Shaking flask culture; A medium (100 ml.) in a reciprocal shaking flash (500 ml.) is sterilized for 20 minutes at 120° C. To this sterilized medium, spores or mycelium of the phenomycin producing organism are inoculated and shake cultured at 27–30° C. on a reciprocal shaking machine with 120 strokes per minute and 8 cm. amplitude. After 48 hours incubation, 2 cc. of the cultured broth is transferred to fresh medium sterilized as above and shake-cultured in the same way as described above.

(2) Tank culture: A medium (200 liters) in a stainless steel tank (250 liters volume) was sterilized for 30 minutes at 120° C. by steaming. Silicone resin or soybean oil was added to the medium as an antifoam agent, if necessary, and the fermentation was carried out with aeration at the rate of 200 liters per minute and agitation at 305 r.p.m.

(3) Assay of phenomycin; Phenomycin inhibits Ehrlich ascites tumor in mice and the protein synthesis of Ehrlich ascites tumor cells. Mice received one million Ehrlich ascites tumor cells intraperitoneally and were injected with 0.3 cc. of test material for 10 days from the day inoculation of the tumor cells. The minimum inhibitory concentration against increase of ascites was measured at the 7th days and also the minimum concentration necessary for prolongation of life in half the number of mice tested was determined at the 35th day. The biochemical assay for phenomycin was made as follows; ascites fluid was taken from mice 9–10 days after the mice received 2 million tumor cells. Tumor cells were centrifuged and washed 3 times with 0.02 M. Tris buffer (pH 7.6) containing 0.04 M. glucose and 0.14 M. NaCl. Tumor cells thus washed were added to a small amount of water and kept in a cold room for 10 minutes. Then they were homogenized with a Teflon-homogenizer and added to a solution consisting of KCl, $MgCl_2$, sucrose and Tris buffer at concentrations of 0.025 M., 0.005 M., 0.25 M. and 0.05 M. respectively. This homogenate can be kept at $-80°$ C. Test material containing phenomycin of gradient concentration from 0.5 mcg. to 5 mcg./ml. was added to the homogenate and the inhibition rate of protein synthesis was measured by the method described in J. Antibiotics, 19A, p. 282 (Nitta et al.). The minimum concentration necessary for 50% inhibition was determined. The chemical assay for phenomycin was made as follows; Test material was dissolved in 50–100 cc. water (pH 7) and to the solution was added 2 g. cation exchange CM cellulose and stirred for about 30 minutes. After separation of the CM cellulose and washing with water, impurities was eluted by 0.1 M. ammonium formate (pH 7.0). Phenomycin was eluted by 0.5 M. ammonium formate (pH 8.0) and its adsorption at 278 m.° was measured.

A phenomycin producing strain of *Streptomyces fervens* var. *phenomyceticus* was shake-cultured in the following medium at the beginning of the study; meat extract 0.75%, peptone 0.75%, NaCl 0.3%, starch 1.0%, glucose 1.0% (pH 7.0). At the 5th day of fermentation, 15–20 mcg./cc. of phenomycin was present. In repeated fermentations, the pH of the broth was 6.0, 6.7, 7.6, 7.9, 8.2 and phenomycin contents were 7 mcg./cc., 15 mcg./cc., 18 mcg./cc., 17 mcg./cc., 18 mcg./cc. at the 3rd, 4th, 5th, 6th and 7th day respectively. Phenomycin was found to be produced in various media as exemplified below.

As shown above, carbon sources such as glycerol, starch, glucose were good carbohydrates for the production of phenomycin and nitrogen sources such as N-Z amino, yeast extract were good for the production of phenomycin. It was noted that phenomycin production was affected by different meat extract products. Casein hydrolysate and casein were also good sources of nitrogen. The medium consisting of 0.75% casein hydrolysate, peptone 0.75%, NaCl 0.3% and glucose 1.0% was sterilized and adjusted to pH 7.0. During the fermentation of this medium, the pH was 6.4, 7.5 and 7.8 at the 3rd, 4th and 5th day respectively. Broth having a phenomycin concentration of 23 mcg./cc. was produced at the 5th day. The medium consisting of starch 1.0%, glucose 1.0%, peptone 0.75% and milk casein 0.75% (pH 7.0) was shake-cultured and the pH changed to 6.0, 6.8, 7.5 and 7.9 at the 3rd, 4th, 5th and 6th day respectively. The broth at the 5th day contained 18 mcg./cc. of phenomycin.

In general poor production of phenomycin was obtained in synthetic media but good production was obtained in a medium containing natural nitrogen and carbon sources. The pH for maximum production of phenomycin depended on the constituents in the medium employed. As with known antibiotics, it is anticipated that improved strains for phenomycin production can be obtained by single colony selection, or by treatment with ultraviolet light, X-ray or other mutagenes.

Phenomycin is stable at pH 2.0–8.5. It is similar to known antibiotics in that high production of phenomycin can be achieved in tank fermentation under selected conditions after selection of suitable conditions for high production by shaking culture. Phenomycin exists mainly in the liquid portion of the broth. The liquid part of the broth containing phenomycin can be separated from the solid part of the broth by known methods such as filtration or centrifugation. As described later, phenomycin is adsorbed on a cation exchange resin from the liquid part containing phenomycin after separation of solid part from the broth. Phenomycin in water is not transferred to solvents such as butanol, ethyl acetate, butyl acetate, ether, or benzene and these solvents can be used for removing impurities. Phenomycin solved in water is concentrated by evaporation under decreased pressure and dried. During this procedure, it is desirable to keep the pH below 7 at which pH phenomycin is stable. A flask evaporator or spray dryer can be used for the evaporation. The residue thus obtained is washed with organic solvents such as methanol, ethanol, acetone or ethyl acetate to remove impurities. Phenomycin can be eluted with water from the residue and it can be precipitated from its aqueous solution by organic solvents in which phenomycin is not soluble and the organic solvents are soluble. Phenomycin in an aqueous solution can be adsorbed on active carbon and the phenomycin can be eluted with acidic water, acidic methanol or acidic acetone. Phenomycin is a basic peptide of high molecular weight and an ion exchange resin can be used for the isolation. Ion exchange resins such as the sulfonic acid type, carbonic acid type or phenol type can be used depending on the basic property and Van der Waalso force of phenomycin. It is recommended for the isolation to use a cation exchange resin of the carbonic acid type and carboxymethyl-cellulose. For example, a cation exchange resin such as IRC–50 (the product of Rohm and Haas Co.) adsorbs phenomycin and elution therefrom produces the product. This resin of the H type also can be used. It is preferred that an aqueous solution of phenomycin such as the fermented broth at pH 7.0 be passed through the column of Na type or ammonium type resin and the elution of phenomycin be made by use of a solution such as diulte hydrochloric acid, dilute ammonia or NaCl solution after washing the adsorbed column with water. The eluate thus obtained is adjusted to pH 5–7 and dried under decreased pressure or lyophilized to yield crude phenomycin.

The molecular weight of phenomycin is estimated to be between 2,500 and 10,000. Phenomycin can be separated from substances of less molecular weight by using Sephadex (the product of Pharmacia, Uppsula, Sweden). Crude phenomycin obtained as above is dissolved in a small amount of water and passed through a column of Sephadex G–25. The phenomycin fraction is passed ahead of the inorganic salt fraction. The former fraction is concentrated in vacuo and lyophilized to yield phenomycin as a powder. Alternatively, crude phenomycin obtained after treatment with resin (IRC–50) as above is dissolved in a small amount of water and dialyzed by use of a cellophane membrane. The inner solution containing phenomycin is concentrated in vacuo or lyophilized to yield phenomycin as a powder. Thus, phenomycin can be separated from substances of low molecular weight utilizing its high molecular weight.

Cation exchange resins can be used not only for the isolation of phenomycin as a crude powder but also for its purification. For example, phenomycin is dissolved in 0.05 M. $HCOONH_4$ (pH 4.5 by HCOOH) and applied to a column of carboxymethyl cellulose which was previously treated with the above solvent. Gradient-chromatography is made by gradient addition of 0.5 M. $HCOONH_4$ (pH 8.4 by $NH_4OH$) to the above solvent. The effluent having maximum adsorption at 278 m$\mu$ is lyophilized and yielded phenomycin as a white powder.

Phenomycin is a basic polypeptide which is soluble in water and slightly soluble in organic solvents. Phenomycin can be obtained in its crude or purified state, in its base form or salt form by elimination of impurities by known treatments such as dissolving, precipitation, adsorbing, elution, distillation, drying, washing, dialysis or transfer.

The properties of phenomycin are as follows: Phenomycin is obtained as a white powder. It is a basic polypeptide and its melting point is not clearly determined. It is soluble in water and slightly soluble in methanol, ethanol, acetone, ethyl acetate, butyl acetate, ether, benzene and petroleum ether. It is absorbed on cation exchange resins and is eluted with solutions such as hydrochloric acid solution, hydrochloric aqueous methanol, ammoniacal solution or NaCl solution.

Figure 2:
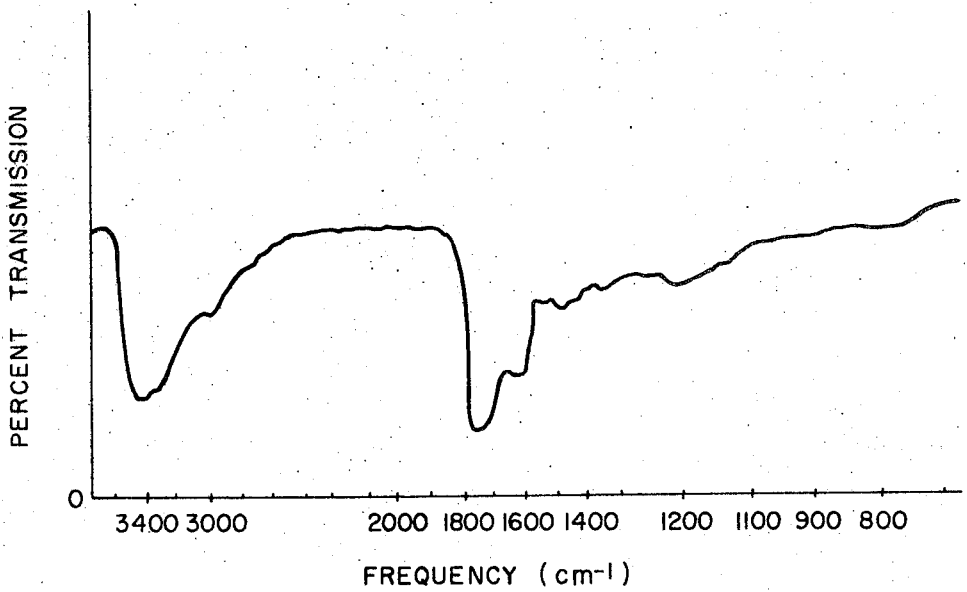
FIG. 2 is the infrared absorption spectrum of phenomycin in potassium bromide.

An aqueous solution of phenomycin shows no clear ultraviolet absorption maxima other than that at $$278 \text{ m}\mu \ (E_{1 \text{ cm.}}^{1\%} = 11.5)$$

as shown in FIG. 1. When pelleted with potassium bromide it shows infrared absorption at wavelength of 3440, 2960, 1650, 1530, 1440, 1385, 1345, 1240 and 1125 cm.$^{-1}$ as shown in FIG. 2.

It produces positive Sakaguchi, ninhydrin, biuret, Liebermann, Poneeau 3R reactions but negative Neubauer-Rhode, Molish and Benedict reactions.

When it is hydrolyzed for 18 hours in 6N-HCl, it gives 16 kinds of amino acids and ammonia by the method of Stein-More. Those amino acids are lysine, histidine, arginine, asparagine, threonine, serine, glutamic acid, proline, glycine, alanine, valine, methionine, isoleucine, leucine, tyrosine and phenylalanine.

Phenomycin remains at the original starting point on paper chromatography using an upper layer of solvent consisting of butanol-acetic acid-water (100:12:100). Phenomycin moves 1.5 cm. toward the cathode within 1 hour by electrophoresis (5 mv./cm.) on a cellulose acetate membrane with phosphate buffer (pH 7.0). Phenomycin is optically active and an aqueous solution of phenomycin at a concentration of 20 mg./5 cc. exhibits an optical rotation of $[\alpha]_D^{17} = -18°$. Its elemental analysis is C, 47.25%; H, 7.30%; N, 15.77%; S, 0.79%; no halogen or phosphorus.

Phenomycin is a basic polypeptide and can be extracted by using a cation exchange resin. It forms hydrochloride and sulfate salts and can be salted out from its aqueous solution as its reineckate, helianthate or picrate.

Phenomycin at a concentration of 100 mcg./cc. has essentially no inhibitory activity against Staphylococci, *Bacillus subtilis, Escherichia coli,* acidfast bacteria, Salmonella or other bacteria.

It inhibits the protein synthesis of Ehrlich ascites tumor cells in tissue culture by about 50%.

When mice were inoculated subcutaneously with Ehrlich tumor cells and phenomycin was administered intraperitoneally at a dose of 1 mcg./mouse/day for 10 days starting 24 hours after inoculation, a 50% inhibition of the growth of the tumor was found and doses as low as 0.3 mcg./mouse/day administered for 10 days prolonged the life of mice.

Phenomycin differs from known antibiotics which have no antibacterial activity but have inhibitory activity to tumor cells in tissue culture and in Ehrlich ascites tumor. Carzinocidin which was described by Harada et al. in J. Antibiotics, vol. 9, p. 6 and 9 is antibiotic produced by a streptomyces and shows the end absorption of ultraviolet light only, but it differs from phenomycin in its other properties, for example, it is soluble only in alkaline water and is adsorbed on active carbon at pH 2 but is not adsorbed at pH 8.0. Marinamycin which is antibiotic produced from a streptomyces and is described by Soeda et al. (J. Antibiotics, 12B, 300, 1959) showed no absorption of ultraviolet light, thus differentiating it from phenomycin. Carzinostatin which is described by Ishida et al. (Cann vol. 51, 56, and J. Antibiotics 14A, 27, 1961) is an acidic polypeptide which is not adsorbed by cation exchange resins, thus differentiating it from phenomycin. Peptimycin reported by Murase et al. (J. Antibiotics 14A, 111, 1961) is produced from a strain belonging to *Streptomyces mauvecolor* and can be recovered by treatment with a cation exchange resin similarly to phenomycin. But it differs from the latter in that its hydrolysate contains 10 amino acids i.e. leucine, valine, alanine, arginine, aspartic acid, histidine, glutamic acid, glycine, serine and one unidentified amino acid, it gives a negative Sakaguchi reaction and has no optical rotation. Enomycin which was discovered by Suhara et al. (J. Antibiotics, 16A, 107, 1963) and reported by Mizuno et al. (J. Antibiotics, 19A, 97, 1966) is a basic polypeptide. It is produced from a Streptomyces resembling *Streptomyces mauvecolor* which was clearly different from *Streptomyces fervens* var. *phenomyceticus*, the phenomycin producer. Moreover, enomycin has an optical rotation of −52° in aqueous solution and its elemental analysis is; C, 47.1%; H, 7.40%; N, 14.45% and contains practically no sulfur, unlike phenomycin. Its hydrolysate contains 15 amino acids i.e. histidine, arginine, aspartic acid, threonine, serine, glutamic acid, proline, glycine, alanine, valine, methionine, isoleucine, leucine and tyrosine but it does not contain phenylalanine in contrast to phenomycin. Actinogan which is described by Schmitz et al. (Cancer Research, 22, 163, 1962) is antibiotic produced from a Streptomyces but differs from phenomycin in the following characteristics; it is not absorbed by cation exchange resins, its molecular weight is about 134,000, its elemental analysis is C, 44.61%; H, 5.85%; N, 2.00%; its hydrolysate contains aspartic acid, glutamic acid, glucose, rhamnose and hexosamine. Iyomycin which was reported by Nomura et al. (J. Antibiotics 17A, 104, 1964) can be differentiated from phenomycin as follows; it is basic polypeptide having weak anti-bacterial activity against Gram positive bacteria, it moves to the cathode by electrophoresis and contains cystin or cystein. Neocarzinostatin which was reported by Maeda et al. (J. Antibiotics, 18A, 68, 1965 and 19A, 253, 1966) differs from phenomycin as follows; it is an acidic polypeptide and is not obtainable by treatment with a cation exchange resin, it has inhibitory activity against *Sarcina lutea*, *Staphylococcus aureus* and *Bacillus subtilis* at a concentration of 2–32 mcg./cc., its hydrolysate contains 15 amino acids including cystein but no methionine. The producers of the above antibiotics all belong to the genus Streptomyces but they are clearly different from the producer of phenomycin, *Streptomyces fervens* var. *phenomyceticus*.

The following examples are merely illustrative and it should be understood that the invention is not limited to these examples.

EXAMPLE 1

A medium (100 cc.) containing glucose 1%, starch 1%, meat extract 1%, peptone 1% and NaCl 0.3% was sterilized in a 500 cc. flask for 20 minutes at 120° C. To this medium, *Streptomyces fervens* var. *phenomyceticus* strain MA 564–C1 was inoculated and shake-cultured at 27–29° C. on a reciprocal shaking machine with 120 strokes per minute and 8 cm. amplitude. On the 5th day of incubation, the fermented broth of 100 flasks was combined and filtered to yield 8200 cc. of clear filtrate. The filtrate was at pH 8.0 and contained 22 mcg./cc. of phenomycin. A column of 8 cm. diameter was filled with 500 cc. of IRC–50 resin (Na-type) and the filtrate passed through this column after adjusting the pH of the filtrate to 7.6 with dilute hydrochloric acid. Then, the column was washed with water and the elution was made with 1 N HCl. The fractions of eluate which contained chlorine ion and obtained before the pH of eluate decreased to 2.0 were combined. The combined factions (300 cc.) were concentrated in vacuo to 50 cc. The concentrate was put into a cellophane bag and dialysed for 2 hours against tap water to remove NaCl and low molecular impurities. The inner liquid was lyophilized and yielded crude phenomycin of 850 mg. Its purity was about 15%. Administration of the phenomycin produced to mice inoculated with Ehrlich tumor cells at a dose of 4 mcg./mouse/day for 10 days inhibited Ehrlich tumor in the mice.

EXAMPLE 2

Crude phenomycin (820 mg.) obtained in Example 1 was dissolved in 2 cc. water and passed through a column of 1.2 cm. diameter filled with 10 g. of Sephadex G–25. The effluent was divided into fractions of 10 cc. each. Phenomycin appeared in the 4–6th fractions and these fractions were lyophilized to yield 260 mg. of powder. This powder administered at a dose of 1 mcg./mouse/day for 10 days inhibited Ehrlich tumor of mice.

EXAMPLE 3

Phenomycin powder (250 mg.) obtained in Example 2 was dissolved in 10 cc. of 0.05 M. $HCOONH_4$ (pH 4.5) and passed through a column of 1 cm. diameter filled with 2.0 g. of carboxymethyl cellulose (suspended in 0.05 M. $HCOONH_4$; pH 4.5). Elution was made with 100 cc. 0.05 M. $HCOONH_4$ (pH 4.5) and 1000 cc. of 0.5 M $HCOONH_4$ (adjusted pH 8.5 by $NH_4OH$) added gradually. The effluent was divided into 20 cc. fractions and 1 cc. of each fraction was added to 4 cc. of water to make 5 cc. diluents. The ultraviolet absorption of each diluent was measured by a Carriers electrophotometer at wave length of 260–290 m$\mu$. The 46th–51st fractions showed maximum absorption at 278 m$\mu$ and these fractions were combined. After removing $HCOONH_4$ by dialysis in cellophane for 2 hours against tap water, the inner liquid was lyophilized to yield 98 mg. of pure phenomycin. This pure phenomycin gave one spot which moved to the anode-side by electrophoresis on cellulose-acetate membrane with phosphate buffer (pH 7) and developed by Ponceau–3R reaction. This powder administered at a dose of 0.3 mcg./mouse/day for 10 days inhibited Ehrlich tumor of mice.

EXAMPLE 4

A medium (200 liters) containing starch 1%, peptone 1%, milky casein hydrolysate 1%, NaCl 0.5% (pH 7.0) was sterilized in a stainless steel tank and inoculated with strain MA 564–C1. After 66 hours of fermentation, the broth was at pH 7.6 and was removed from the fermenter. The browth was centrifuged to remove solid materials and yielded 190 L. of clear broth. To this, 15 L. of IRC–50 (Na-type) was mixed and stirred. After separation from the liquid, the IRC–50 resin was applied to a column (10 cm. diameter) and washed with 100 L. of water. Then, elution was carried out by passing N–$NH_4OH$ at the rate of 50 cc./min. through the column. The elutates positive to ninhydrin reaction were collected and aerated to remove ammonia. Then, it was adjusted to pH 6 and lyophilized. Brownish powder (550 g.), was obtained. This material inhibited Ehrlich tumor of mice by administration at a dose of 80 mcg./mouse/day for 10 days. The powder of 100 g. was dialyzed by cellophane membrane against tap water and purified by the procedures described in Example 2 and 3. The purified phenomycin (320 mg.), thus obtained, was inhibitory to Ehrlich tumor of mice by administration at a dose of 0.3 mcg./mouse/day for 10 days.

EXAMPLE 5

Strain MA 564–C1 of *Streptomyces fervens* var. *phenomyceticus* was cultivated in various media described in Tables 1 and 3 according to the procedure of Example 1. The pH and phenomycin content of the broth at various times during the cultivation in each medium are shown in Tables 2 and 4.

TABLE 1

| Med. No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Composition (percent): | | | | | | | | | | | | | | | | |
| Glycerol | 2 | 2 | 2 | 2 | | | | | | | | | | | | |
| Lactose | | | | | 2 | 2 | 2 | 2 | | | | | | | | |
| Starch | | | | | | | | | 1 | 1 | 1 | 1 | | | | |
| Glucose | | | | | | | | | 1 | 1 | 1 | 1 | 2 | 2 | 2 | 2 |
| Meat extract | 1 | | | | 1 | | | | 1 | | | | 1 | | | |
| Peptone | 1 | | | | 1 | | | | 1 | | | | 1 | | | |
| NZ-amine | | 1 | | | | 1 | | | | 1 | | | | 1 | | |
| Yeast extract | | 0.2 | | | | 0.2 | | | | 0.2 | | | | 0.2 | | |
| Soybean meal | | | 2 | | | | 2 | | | | 2 | | | | 2 | |
| Corn steep liquor | | | | 2 | | | | 2 | | | | 2 | | | | 2 |
| NaCl | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |

TABLE 2

| | pH | | | | | | Phenomycin content* | |
|---|---|---|---|---|---|---|---|---|
| Date | 2 | 3 | 4 | 5 | 6 | 7 | 4 | 5 |
| Med. No.: | | | | | | | | |
| 1 | 5.8 | 7.0 | 7.6 | 7.8 | 7.9 | 7.9 | ± | + |
| 2 | 5.6 | 6.4 | 7.0 | 7.2 | 7.2 | 7.2 | + | + |
| 3 | 5.8 | 7.2 | 7.6 | 7.8 | 7.8 | 8.0 | ± | ± |
| 4 | 5.8 | 5.8 | 6.2 | 6.6 | 6.6 | 6.7 | ± | + |
| 5 | 6.2 | 6.7 | 7.5 | 7.9 | 8.2 | 8.4 | ++ | ++ |
| 6 | 6.1 | 6.7 | 6.9 | 6.9 | 7.3 | 7.5 | ++ | ++ |
| 7 | 5.7 | 6.4 | 6.8 | 7.3 | 7.7 | 7.9 | − | − |
| 8 | 5.4 | 6.8 | 7.6 | 7.9 | 7.9 | 8.1 | ± | ± |
| 9 | 5.9 | 7.0 | 7.6 | 8.1 | 8.5 | 8.6 | ++ | +++ |
| 10 | 6.4 | 6.9 | 7.3 | 7.6 | 7.7 | 7.7 | ± | ++ |
| 11 | 5.4 | 6.1 | 6.2 | 7.5 | 7.8 | 8.1 | − | ± |
| 12 | 6.0 | 6.3 | 7.6 | 8.1 | 8.1 | 8.2 | ± | + |
| 13 | 5.8 | 6.7 | 7.3 | 7.7 | 7.7 | 7.8 | ± | ++ |
| 14 | 5.4 | 5.6 | 6.3 | 6.3 | 6.5 | 6.7 | + | + |
| 15 | 5.0 | 5.5 | 7.1 | 7.5 | 7.5 | 7.8 | − | ± |
| 16 | 5.4 | 5.9 | 7.4 | 7.8 | 8.2 | 8.2 | ± | + |

*— less than 1 mcg./cc; ± 1–5 mcg./cc.; + 5–10 mcg. /cc.; ++ 10–20 mcg./cc.; +++ more than 20 mcg./cc.

TABLE 3

| Med. No. | 1 | 2 | 3 | 4 | 5 | 6 | 7 | 8 | 9 | 10 | 11 | 12 |
|---|---|---|---|---|---|---|---|---|---|---|---|---|
| Basal medium* plus (percent): | | | | | | | | | | | | |
| Meat extract (Arei) | 1 | 2 | 1 | 2 | | | | | | | | |
| Meat extract (Mikuni) | | | | | 1 | | | | | | | |
| Meat extract (Kyokuto) | | | | | | 1 | | | | | | |
| Corn steep liquor | | | | | | | 1 | 2 | | | | |
| Casein hydrolysate | | | | | | | | | 1 | 2 | | |
| Yeast | | | | | | | | | | | 1 | 2 |
| Polypeptone | 1 | 1 | 1 | 1 | 1 | 1 | 1 | 1 | | | | |

*Basal medium; glucose 1%, starch 1%, NaCl 0.3%.

TABLE 4

| | pH | | | | Phenomycin content* |
|---|---|---|---|---|---|
| Date | 3 | 4 | 5 | 6 | 5 |
| Med. No.: | | | | | |
| 1 | 5.8 | 6.0 | 6.8 | 6.8 | ± |
| 2 | 5.6 | 6.0 | 6.6 | 6.8 | ± |
| 3 | 5.3 | 7.2 | 7.9 | 8.0 | +++ |
| 4 | 5.2 | 7.3 | 7.4 | 7.6 | +++ |
| 5 | 6.1 | 6.3 | 6.4 | 6.4 | − |
| 6 | 6.2 | 6.0 | 7.1 | 7.1 | − |
| 7 | 5.9 | 7.1 | 7.6 | 7.7 | ± |
| 8 | 5.2 | 6.3 | 6.5 | 6.5 | ± |
| 9 | 6.1 | 6.5 | 6.5 | 6.7 | + |
| 10 | 5.8 | 5.8 | 6.3 | 6.9 | + |
| 11 | 5.9 | 7.3 | 7.3 | 7.4 | + |
| 12 | 6.3 | 7.6 | 7.6 | 8.2 | + |

*— less than 1 mcg./cc.; ± 1–5 mcg./cc.; + 5–10 mcg./cc.; ++ 10–20 mcg./cc.; +++ more than 20 mcg./cc.

The present invention includes the pharmaceutically acceptable nontoxic salts of phenomycin including the organic and inorganic acid addition salts, e.g. hydrochloride, sulfate, citrate, succinate, acetate and phosphate. These inorganic and organic salts may be employed for the extraction and purification of phenomycin.

While this invention has been described and exemplified in terms of its preferred embodiment, those skilled in the art will appreciate that modifications can be made without departing from the spirit and scope of the invention.

I claim:

1. The antibiotic designated phenomycin which:
   (a) is effective in inhibiting the growth of Ehrlich ascites carcinoma cells;
   (b) is soluble in water and slightly soluble in alcohols, esters, acetone, ether and benzene;
   (c) exhibits a weak ultraviolet absorption maximum at 278 M$\mu$ in aqueous solution, as shown in FIG. 1,
   (d) exhibits characteristic bands in the infrared absorption spectrum at 3440, 2960, 1650, 1530, 1440, 1385, 1345, 1240 and 1125 cm.$^{-1}$ as shown in FIG. 2;
   (e) has an optical rotation of $[\alpha]_D^{17} = -18°$ in an aqueous solution containing 20 mg. phenomycin per 5 cc. of water;
   (f) gives positive Sakaguchi, ninhydrin, biuret, Liebermann and Poneau 3R reactions, and negative Neubauer-Rhode, Molish and Benedict, reactions;
   (g) has the following elemental analysis: C, 47.25%; H, 7.30%; N, 15.77%; S, 0.79%; and
   (h) gives by hydrolysis the following amino acids: lysine, histidine, arginine, asparagine, threonine, serine, glutamic acid, proline, glycine, alanine, valine, methionine, isoleucine, leucine, tyrosine and phenylalanine.

2. The hydrochloride salt of the antibiotic of claim 1.

3. The process for the production of an antibiotic, designated phenomycin, which comprises cultivating *Streptomyces fervens* var. *phenomyceticus* NIHJ MC–1–42 in an aqueous carbohydrate solution containing a nitrogenous nutrient under submerged aerobic conditions until substantial anti-Ehrlich ascites tumor activity is imparted to said solution and then recovering said phenomycin from said solution.

4. The process of claim 3 wherein the antibiotic phenomycin is recovered from an aqueous solution thereof by adsorption with a cation exchange resin.

5. The process of claim 3 wherein the antibiotic phenomycin is separated from small molecular impurities by dialysis against water.

References Cited

Nakamura et al.: J. of Antibiotics, Ser. A, vol. 20, No. 4, July 1967, pages 210–216.

JEROME D. GOLDBERG, Primary Examiner

U.S. Cl. X.R.

195—80